US012181328B2

(12) United States Patent
Mudd et al.

(10) Patent No.: US 12,181,328 B2
(45) Date of Patent: Dec. 31, 2024

(54) FLOW THROUGH PRESSURE SENSOR STRUCTURED TO REMOVE DEAD VOLUME

(71) Applicant: Illinois Tool Works Inc., Glenview, IL (US)

(72) Inventors: Daniel Mudd, Freemont, CA (US); Mohamed Saleem, Freemont, CA (US); Arun Nagarajan, Freemont, CA (US); Andrew J. Staudt, Langhome, PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/852,090

(22) Filed: Apr. 17, 2020

(65) Prior Publication Data

US 2021/0325223 A1    Oct. 21, 2021

(51) Int. Cl.
*G01F 7/00*    (2006.01)
*G01F 1/76*    (2006.01)

(52) U.S. Cl.
CPC ............... *G01F 7/005* (2013.01); *G01F 1/76* (2013.01)

(58) Field of Classification Search
CPC .................................. G01F 7/005; G01F 1/76
See application file for complete search history.

(56) References Cited

U.S. PATENT DOCUMENTS 4,235,105 A    11/1980    Walters
6,119,710 A  *  9/2000    Brown ..................... G01F 1/50
                                                         137/14
7,302,863 B2    12/2007    Kielb et al.
(Continued)

FOREIGN PATENT DOCUMENTS

EP    1345011 A2    9/2003
JP    2005507996    3/2005

OTHER PUBLICATIONS

Kumar, K., et al. "By-Pass Flow Meter for Sloped Pipelines." Trends in Manufacturing Processes: Select Proceedings of ICFTMM 2018 (2020): 83-92. first published Sep. 11, 2019 (Year: 2019).*

(Continued)

*Primary Examiner* — Eric S. McCall
*Assistant Examiner* — Timothy P Graves
(74) *Attorney, Agent, or Firm* — McAndrews, Held & Malloy, Ltd.

(57) ABSTRACT

A system for removing dead volume in a sensor assembly of a mass flow controller is presented. The system comprises a valve assembly communicable coupled to the sensor assembly. The valve assembly is in fluid communication with fluid in a primary flow path and the sensor assembly is in fluid communication with fluid in the primary flow path. The sensor assembly comprises a pressure transducer having a first reservoir and another pressure transducer having a second reservoir. The first reservoir has a port in fluid communication with fluid in a sampled flow path. The second reservoir is coupled to a second pressure transducer and is fluidly coupled to the first reservoir through a flow through path. The second reservoir also includes another port for communicating the flow of fluid from the flow through path to another flow path. A flow rate restrictor is disposed in the flow through path.

20 Claims, 6 Drawing Sheets

(56) References Cited

U.S. PATENT DOCUMENTS

| | | | |
|---|---|---|---|
| 2003/0172744 A1* | 9/2003 | Matsuzawa | G01F 1/363 73/861.42 |
| 2016/0195415 A1* | 7/2016 | Lull | G01F 1/50 73/861.01 |
| 2016/0216713 A1* | 7/2016 | Mudd | F16K 37/005 |
| 2018/0143052 A1* | 5/2018 | Xie | G01F 1/74 |
| 2018/0216976 A1 | 8/2018 | Mudd et al. | |
| 2019/0078914 A1 | 3/2019 | Doering | |

OTHER PUBLICATIONS

European Search Report issued in related EP 20192300.0, dated Apr. 9, 2021.

Japanese Office Action Appln No. 2020-142395 dated Sep. 18, 2024.

* cited by examiner

FLOW THROUGH PRESSURE SENSOR STRUCTURED TO REMOVE DEAD VOLUME

BACKGROUND

In many manufacturing operations where chemicals are used to manufacture electronic devices, Mass Flow Controllers (MFC's) are used to measure and control the flow rate of fluids delivered to processing chambers. In the manufacture of semiconductor devices, there are more than 50 gases used in etching and Chemical Vapor Deposition (CVD) processes and another 150 gases known in the industry. On a production line, a semiconductor fabrication chamber can contain 9 to 16 MFC's and each production line can contain 1 to 6 chambers. The use of MFC's is prevalent and the gases they control range from inert, to corrosive, to pyrophoric, and/or to highly toxic; where the permissible exposure limit is below 1 parts per million. As such, the ability to fully remove a stagnant gas from a failed MFC is a critical safety requirement when replacing it with a new one.

Beyond the safety issues of replacing a faulty MFC, there is a strong need to "Dry Down" the internal flow passages of a new MFC to remove the atmospheric moisture adhering to the walls of the passages. All devices, including MFCs, exposed to air with any relative humidity, draws molecular level H20 to the walls of their surfaces. Given time, a stable temperature and humidity, the amount of H20 on the walls comes to equilibrium with molecules adhering to the surfaces and departing from the surface in balance. However, when initially installed into a semiconductor processing tool, these atmospheric H20 molecules are still on the internal surfaces and will begin to come off of the walls and join the dry process gas stream causing either corrosion issues or process chemistry issues downstream of the MFC.

Accordingly, it is common in the market, to quantify as part of its performance documentation, the speed with which a new MFC will "dry down" when a dry inert "purge" gas, typically nitrogen or argon is cycled through the MFC to remove the atmospheric moisture from its walls. A typical "dry down" test will establish a known level of moisture on the walls of an MFC, then record the changing moisture level with time in the exhaust of the device as a specified flow rate of a dry purge gas flows through the MFC until the moisture level detected reaches the parts per billion level.

To remove the moisture from the walls of a new MFC or to ensure the removal of a "nasty gas" from an MFC being replaced, the industry has adopted the practice of "flow" purging and "cycle" purging MFCs and other devices with a dry purge gas. Typically, a stream of purge gas would be directed to the MFC, flow through the MFC and then be diverted to a non-process location. After a period of flow purging, valve positions are changed and the device is repeatedly and alternately evacuated to moderate vacuum levels then re-pressurized with the purge gas again for several hundred cycles, eventually bringing the moisture level or the concentration of nasty gas to sub ppm levels.

Beyond the current "safety" advantages and process "dry down" advantages described above, there are additional advantages developing that depend on the efficient and quick replacement of one gas with another. These additional advantages are rooted in the continuing trend to reduce hardware cost and space by flowing multiple gas species through a single MFC. As an example, in a gas box containing 16 gas lines delivering gases to an Etch process tool, each with its own dedicated MFC, 2 to 4 gases can flow simultaneously. Many of these 16 gases are in the same gas families and can be directed to and flow through the same MFC provided the old gas can readily be replaced by the new gas.

Flowing oxygen, nitrogen or argon through the same MFC would be an example. Similarly, multiple Freon gases might also be grouped together. This approach offers significant opportunity to reduce the hardware and associated cost by reducing the number of gas lines from 16 to perhaps 8. However, an efficient way in changing the gas types is required; such as flow purge or cycle purge where new gas is circulated through the MFC to displace the old gas. Without an effective purge, a stagnant volume, referred to as dead head can form in small passages of an MFC. Although purging is an effective practice when used with thermal based MFC's, the practice is not effective when used with pressure based MFC's. Due to natural flow through design of the thermal based MFC's, purging effectively removes dead volumes of gas. Pressure based MFC's, however, do not share the same or similar flow through design and, therefore, purging is not an effective practice of removing dead volumes of gas.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
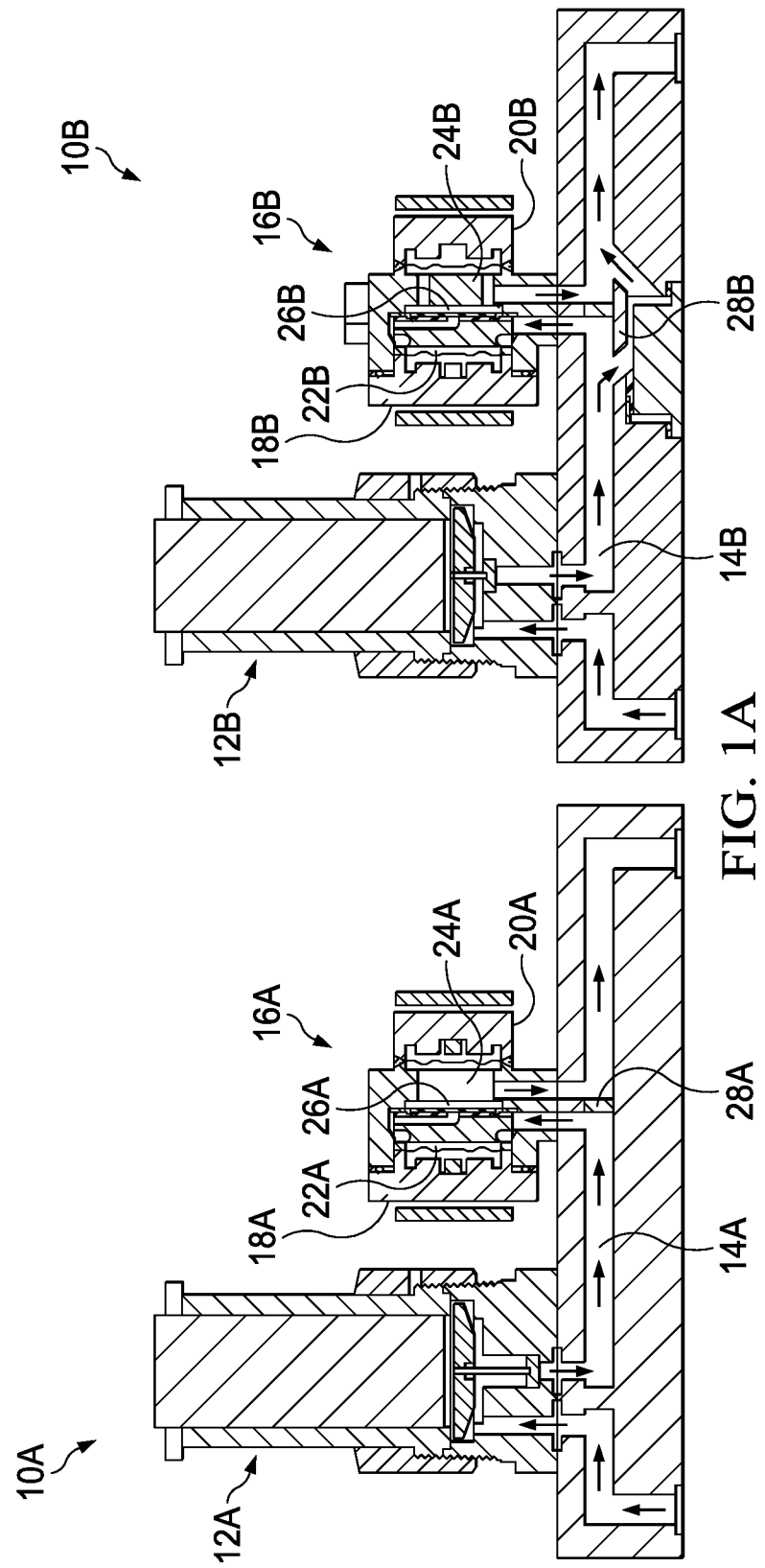
FIGS. 1A and 1B are illustrations of a diagram of various MFC configurations having sensor assemblies designed to include a flow through path and reservoir passages having select volumes, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Pressure based MFC's are typically closed loop designs where a pressure sensor assembly includes a port and a small reservoir so that fluid pressure can be sampled from a primary flow path and measured in order to determine a fluid flow rate. In practice, the sensor assembly can include one or more absolute pressure transducers and one or more differential pressure transducers. Each transducer includes a port and reservoir for sampling fluid pressure from the primary flow path. The primary flow path can include a characterized flow restrictor and fluid pressure can be sampled upstream and downstream from the flow restrictor. Because the reservoir for the transducer doesn't include a flow through path, i.e. it is closed with respect to the primary flow path, a dead head can form in the reservoir, a stagnant volume where the flow of gas does not readily displace the old gas. Again, this configuration causes dead heads, which is a volume not efficiently swept by a gas flow. The dead volume, i.e. the stagnant fluid, is not displaced from the reservoir when gas is flowing through the flow restrictor in the MFC base. Therefore, the reservoir is not swept when new gas is cycled through to replace old gas. The effect of this dead volume on MFC operation is the introduction of unwanted mixture of gases, which can affect downstream processes.

Presented herein is a system, method, and apparatus for inducing a gas flow to sweep through the volume of the sensors' reservoirs thus eliminating the stagnant nature of previous designs, removing dead volume in a transducer assembly of an MFC. The transducer assembly includes a first reservoir coupled to a first pressure transducer, a second reservoir coupled to another pressure transducer, and a flow restrictor disposed in a flow through path that couples the first reservoir with the second reservoir. The flow through path provides for a path for fluid flow between and through the two reservoirs. The effect of this is to have the new gas sweep/displace the previous gas out of the reservoir thus preventing the slow bleeding out of the old gas into the main steam causing an unknown mixture being sent to process for substantial period of time after initiating the changing of gases to the MFC, e.g. switching from one gas type to another gas type in a semiconductor manufacturing operation.

Figure 1B:
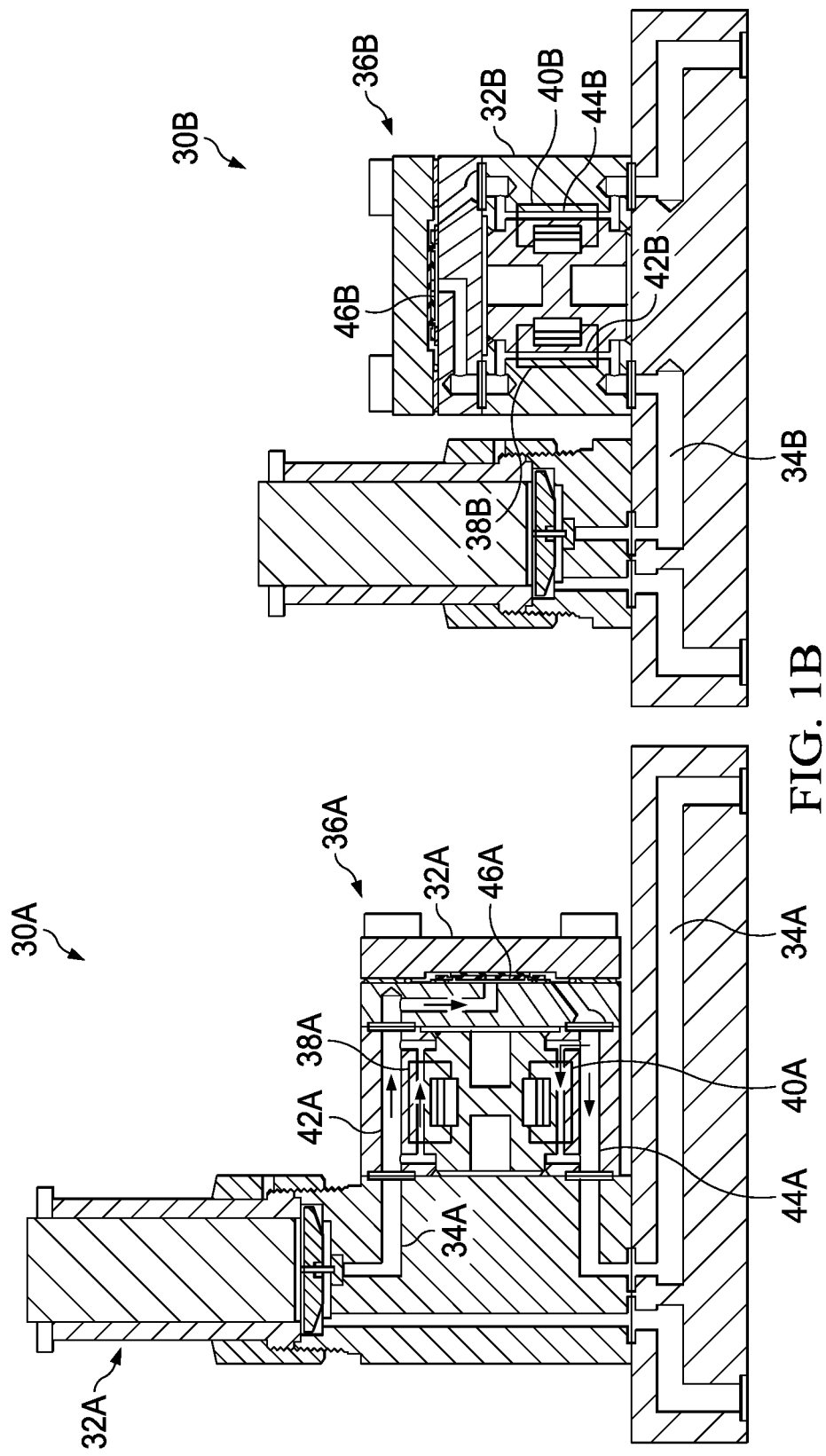

Referring now to FIGS. 1A and 1B, illustrated are various MFC configurations having sensor assemblies designed to include a flow through path and reservoir passages having select volumes, according to certain example embodiments. The overall volume of the reservoirs and the location of the flow through path in a sensor assembly depends on the type of MFC application. For low flow rate applications, a reduced reservoir volume may be needed. For high flow rate applications, an increased reservoir volume may be needed. However, the volume of the reservoir can also be based on a bleed down time. In addition, each reservoir in a sensor assembly can have a unique volume size.

In FIG. 1A, illustrated are two MFC configurations having sensor assemblies having at least one flow through path and reservoir passages having defined volumes, denoted generally as 10A and 10B. MFC configuration 10A includes a valve assembly 12A, a base having a primary flow path 14A with a primary flow path blockage 28A disposed therein, and a sensor assembly 16A. The sensor assembly 16A comprises two absolute pressure transducers 18A, 20A, reservoirs 22A, 24A, at least one flow through path 26A, and a characterized restrictor, not illustrated. MFC configuration 10B includes a valve assembly 12B, a base having a primary flow path 14B and a characterized restrictor 28B disposed therein, and a sensor assembly 16B. The sensor assembly 16B comprises two absolute pressure transducers 18B, 20B, reservoirs 22B, 24B, at least one flow through path 26B, and a characterized restrictor, not illustrated.

MFC configuration 10A is configured to process fluid at lower flow rates, e.g. 0.15 sccm to 500 sccm (standard cubic centimeters per minute). The specific sccm is dependent on the specifics of gas velocity and target pressure drop across the restrictor and can change depending on the specific design and application. MFC configuration 10B is configured to process fluids at higher flow rates, e.g. greater than 500 sccm. The restrictors that are not illustrated and restrictor 28B can be characterized based on a required flow rate. In the sensor assemblies 16A, 16B, the volumes of the reservoirs 22A, 24A and 22B, 24B can be configured to have a defined volume based on the application. As an example, for the lowest full scale flows, the volume for 22A can be reduced so that in response to closing of an upstream valve, e.g. when switching between gases, the bleed down time, the time it takes for the pressure in reservoir 22A to decay as its gas exits through the restrictor 26, also is reduced. The bleed down time constant is proportional to the volume reservoir divided by the full scale flow rate of the MFC. As such larger full scale MFC can have the larger reservoir volumes needed for higher flow without being adversely affected by longer bleed down times. A well designed bleed down time can also reduce or eliminate dead volume in the sensor assemblies 16A, 16B In FIG. 1B, illustrated are two more MFC configurations having sensor assemblies having at least one flow through path and reservoir passages having volumes for certain MFC applications, denoted generally as 30A and 30B. MFC configuration 30A can include a valve assembly 32A, a base having a primary flow path 34A, and a sensor assembly 36A. Sensor assembly 36A can comprises either two absolute pressure transducers or one absolute and one differential transducer 38A, 40A, reservoirs 42A, 44A, at least one flow through path 46A, and a restrictor, not illustrated. MFC configuration 30A includes a sensor assembly 36A having reservoirs 42A, 44A with a volume better suited for higher flow rate applications as the preponderance of the flow passes through the larger passage 42A-1 and a smaller portions of the flow passes though 42A-2 sweeping past the sensor face. MFC configuration 30B can include a valve assembly 32B, a base having a primary flow path 34B, and a sensor assembly 36B. The sensor assembly 36B can comprise of either two absolute pressure transducers or one absolute and one differential transducer 38B, 40B, reservoirs 42B, 44B, at least one flow through path 46B, and a restrictor, not illustrated. MFC configuration 30B includes a sensor assembly 36B having reservoirs 42B and 44B with a reduced volume size and, therefore, is better suited for lower flow rate applications due to bleed down issues. As illustrated, the internal diameter and, therefore, the overall volume of reservoirs 42A, 44A are greater than the volume of reservoir 42B, 44B. In MFC application 30A, the volume of reservoirs 42A, 44A is considered an internal flow path that fluidly couples and is in series with the primary flow path 34A and that is within the structure of the sensor assembly 36A, flow from 34B is split into two parallel paths, with the preponderance of the flow continuing straight through 42A-1 while a small flow is diverted to sweep past the face of the transducer 38A via passage 42A-2. The flows in 42A-1 and 42A-2 join at the entrance of passage of passage 46A, passes through the characterized restrictor and exits to passage 44A where flow is again split into parallel paths 44A-1 and 44A-2, with 44A-2 being diverted to sweep across the sensor face and rejoins 44A-1 exiting to the main flow path in the MFC base 34B. In MFC application 30B, the lower flow rates do not require a splitting of the flow paths 42B and 44B and the entire flow sweeps past the faces of sensors 38B and 40B. In this particular embodiment, the flow rate is low enough that the entire flow can be routed past the sensor face without introducing velocity related problems.

It should also be understood that any of the primary flow path 14 can have a characterized flow restrictor disposed therein. It should also be understood that the sensor assemblies 16 and 36 can include a combination of absolute and differential pressure transducers. It should also be understood that the pressure transducers 18, 20, 38, and 44 described herein, in practice, can comprises a semiconductor based transducer, an oil bath, and isolation diaphragm, wherein fluid traversing the diaphragm produces a force on the diaphragm that is transferred through the oil bath and to the transducer for measurement.

Figure 2A:
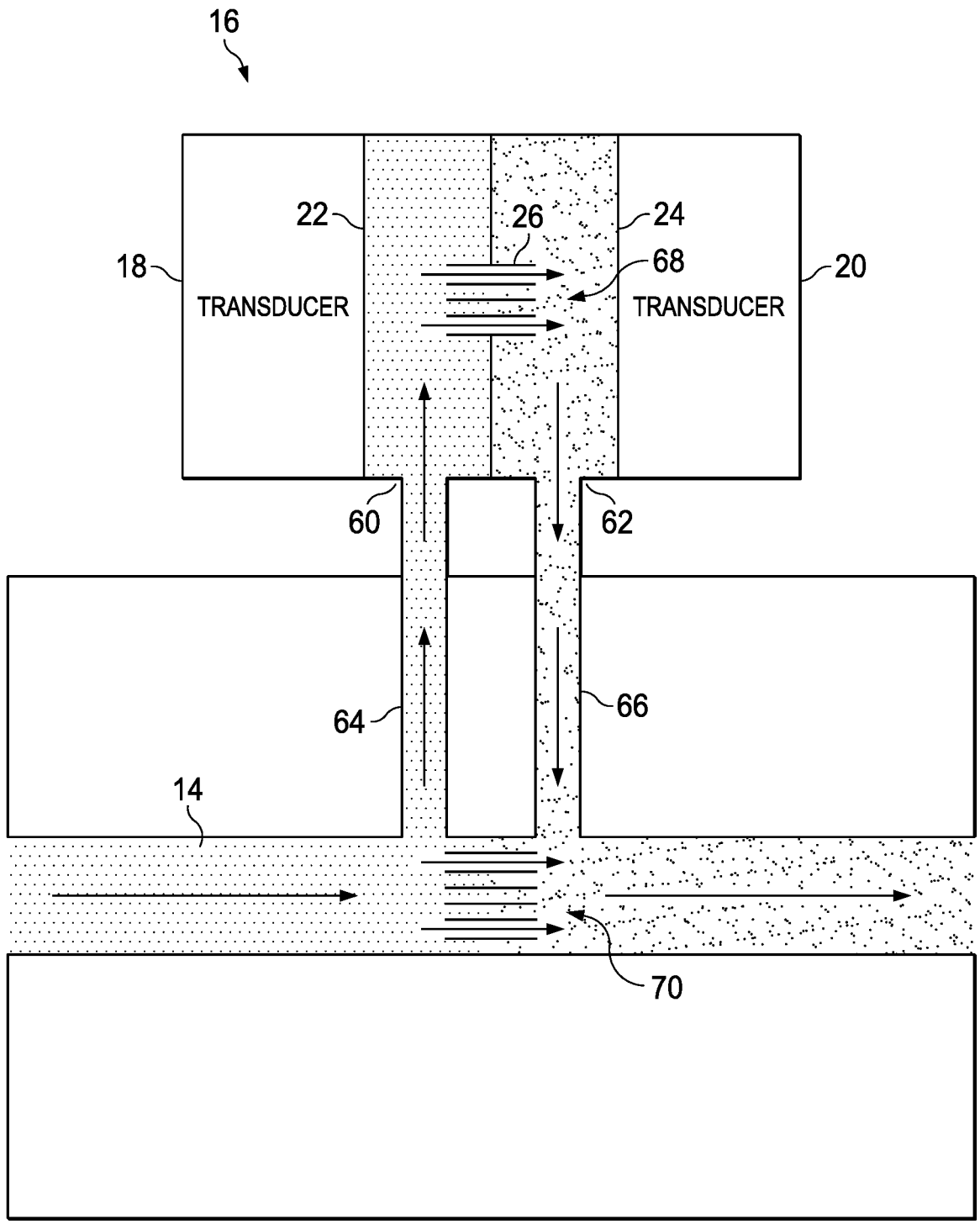
FIGS. 2A-2D are illustrations of diagrams of sensor assemblies having flow through paths and various MFC configurations, in accordance with certain example embodiments.
Figure 2B:
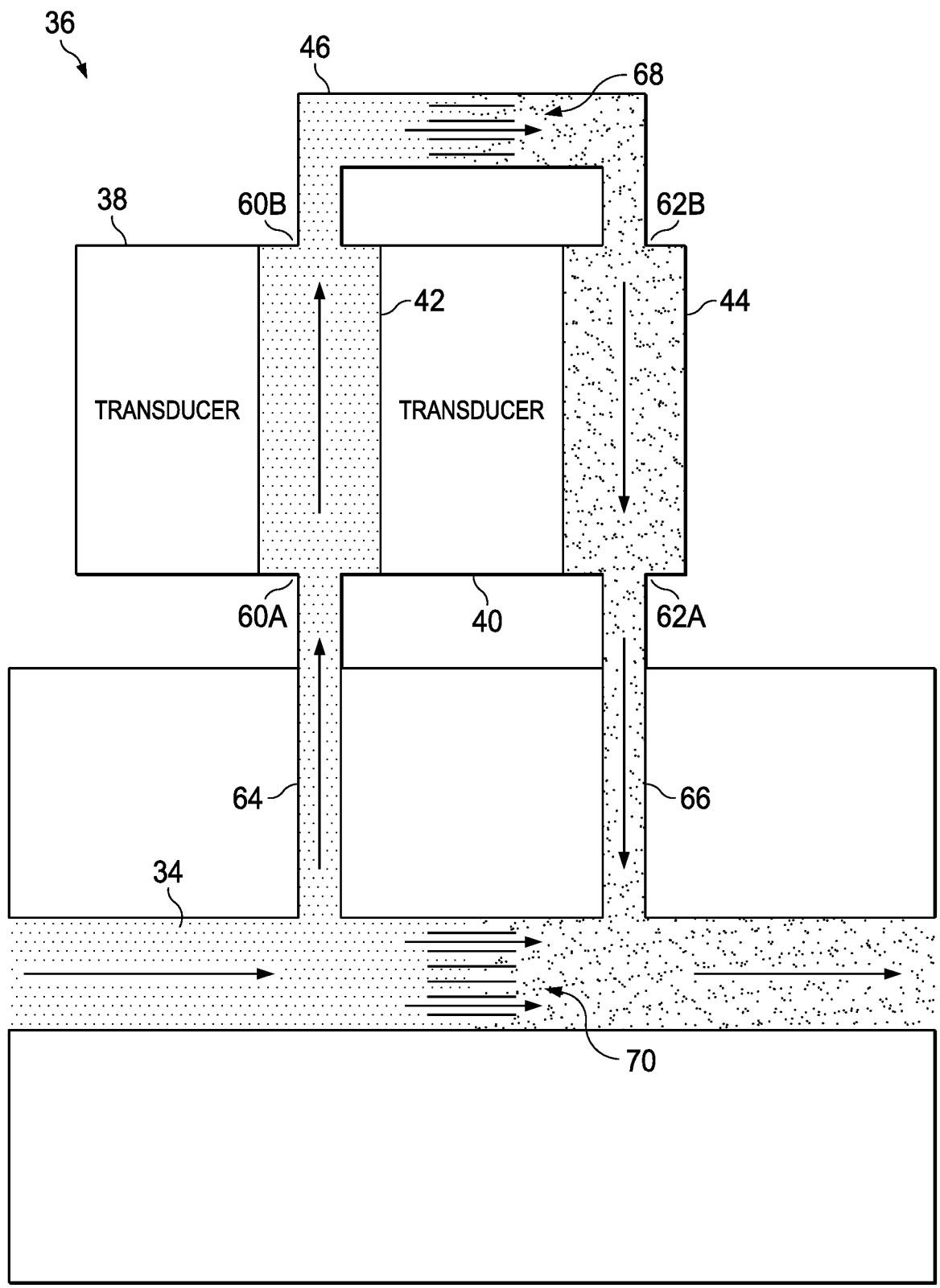
Figure 2C:
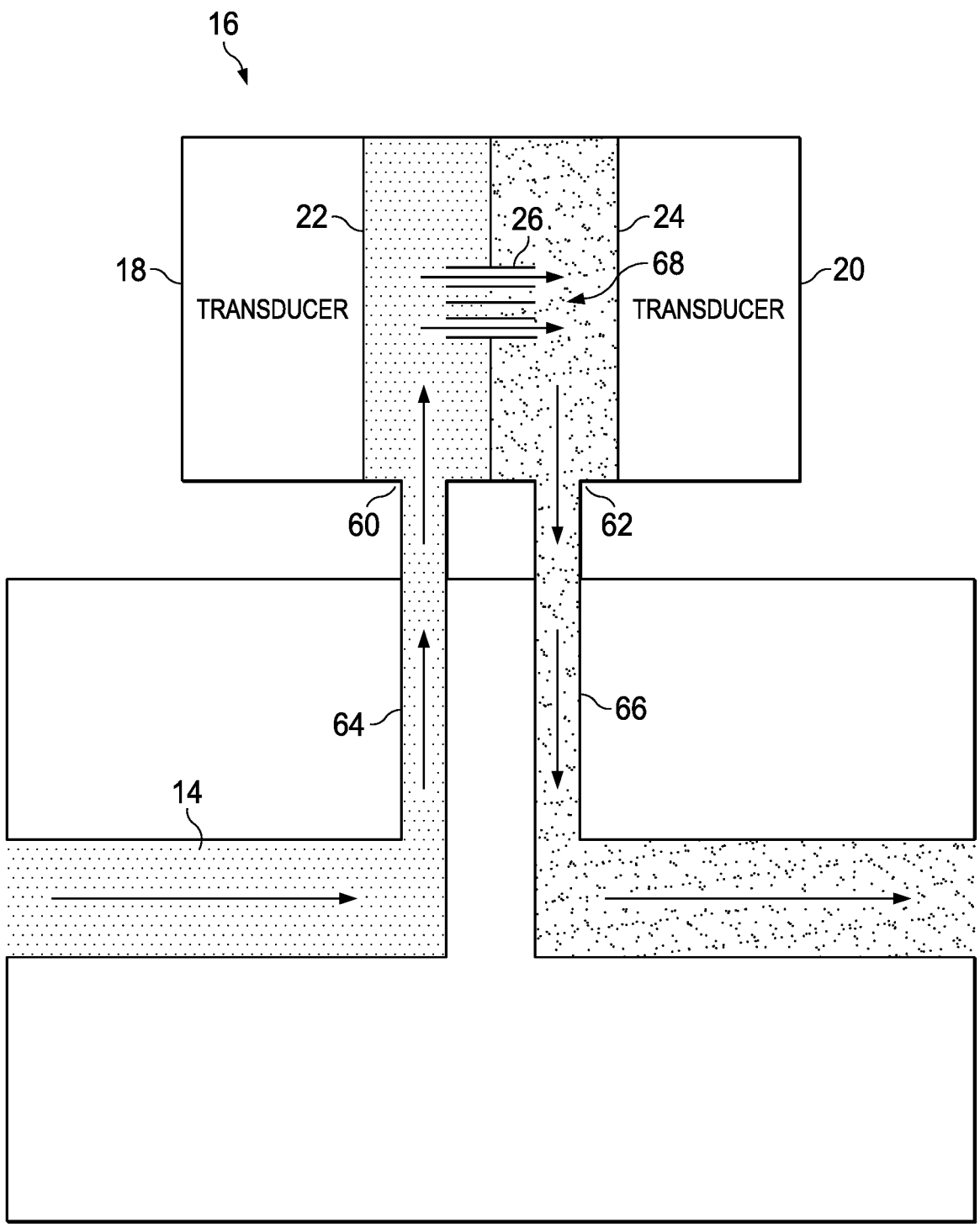
Figure 2D:
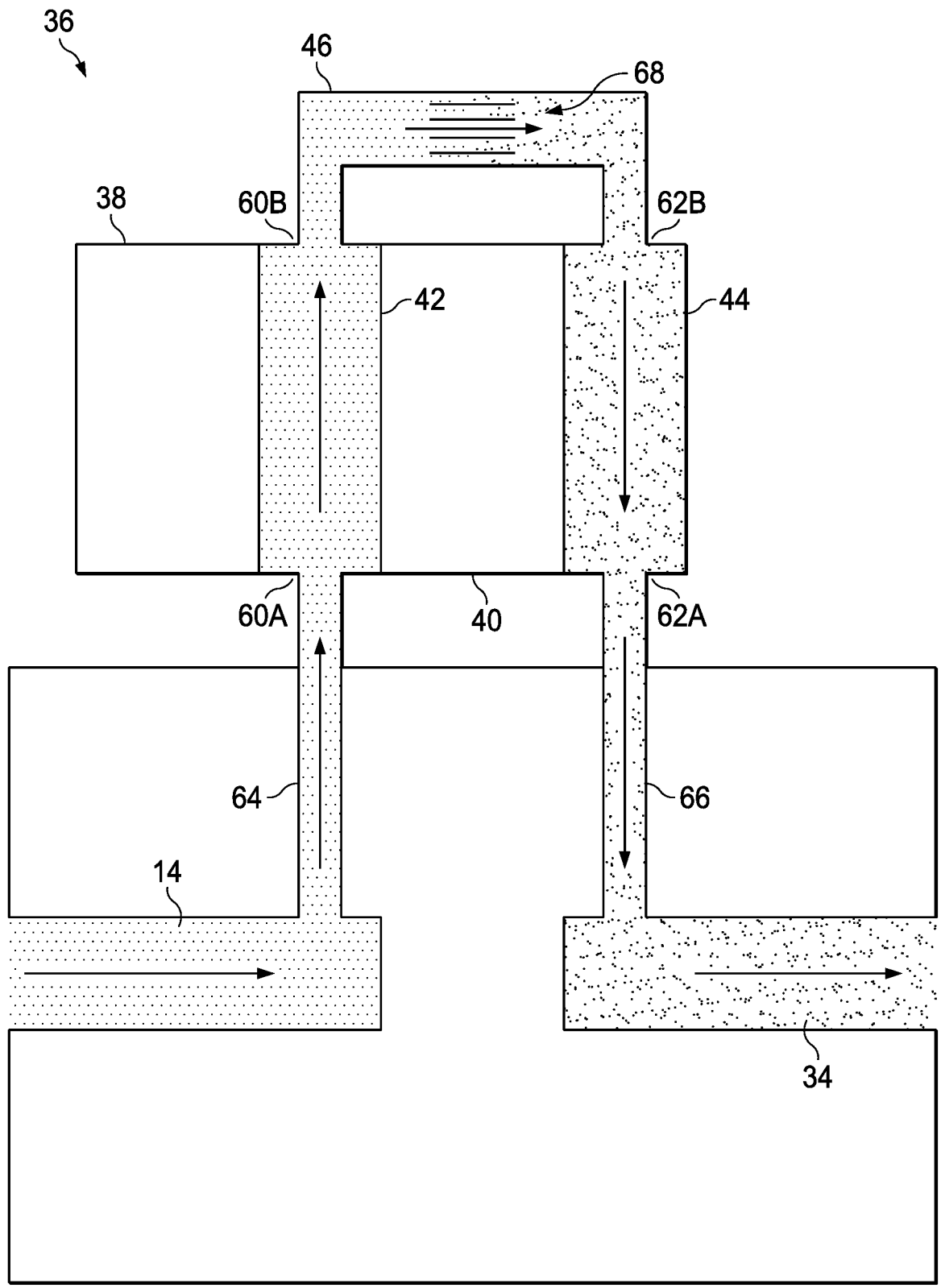

Referring now to FIGS. 2A-2D, illustrated are block diagrams of sensor assemblies 16, 36 having flow through paths and various MFC configurations. In FIG. 2A, the sensor assembly 16 includes pressure transducers 18 and 20. In this particular embodiment, the transducers 18 and 20 are absolute pressure transducers. Reservoirs 22, 24 include ports 60, 62 for receiving fluid through a sampled flow path 64, 66, sampled from the primary flow path 14. In this particular embodiment, the flow through path 26 is disposed between the reservoirs 22, 24 and a characterized restrictor 68 is disposed therein. In FIG. 2B, the sensor assembly 36 includes pressure transducers 38, 40, flow through path 46, and ports 60A-B, 62A-B. The pressure transducers 38, 40 are either an absolute pressure 18 transducer and a differential pressure transducer 40 or two absolute transducers with the pressure sensing face of 40 facing 44. Flow through path 46 fluidly couples port 60B on one end of reservoir 42 with another port 62B on another end of reservoir 44. The characterized restrictor 68 is disposed within the flow through path 46. In both embodiments, a characterized restrictor 70 is disposed within the primary flow paths 14, 34 and carries the bulk of the flow. In FIGS. 2C and 2D, however, the primary flow paths 14, 34 do not include restrictor 70. In certain applications, both restrictors 68 and 70 are not required. In MFC applications where lower flow rates do not create gas velocity issues, restrictor 70 is not required. As such, the design of the MFC is less expensive. In this particular embodiment, the upstream portion of the primary flow path 14, 34 continues through the sampled flow path 64, the flow through path 26, 46, the sampled flow path 66, and back to the downstream portion of the primary flow path 14, 34. Restrictor 68 in this case can be characterized as needed for the particular application. Sampled flow path 64, 66, as used in this specification, relates to a flow path carrying fluid to be measured and that is fluid communications with the pressure transducer 38, 40, and traverses the transducer port 60, 62. Although the sensors assemblies 16, 36 are described with certain transducer configurations, it should be understand that other configurations are also possible. Although the primary flow paths 14, 34 have been illustrated and described as flowing from upstream to downstream, it should be understood that the flow of the fluid along the primary flow paths 14, 34 can be from downstream to upstream. This would obviously mean that the fluid would traverse the reservoirs 22, 24 and the flow through paths 26, 46 in the opposite direction.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus for removing dead volume in a sensor assembly, the apparatus comprising: a first reservoir coupled to a first pressure transducer and having a port in fluid communication at a location in a sampled flow path; a second reservoir coupled to a second pressure transducer, fluidly coupled to the first reservoir through a flow through path, and having another port in fluid communication at another location of another sampled flow path; and a restrictor disposed in the flow through path;

Clause 2, the apparatus of clause 1, wherein the first pressure transducer is an absolute pressure transducer and the second pressure transducer is one of selected from the group comprising another absolute pressure transducer and a differential pressure transducer;

Clause 3, the apparatus of clause 1, wherein the second pressure transducer is a differential pressure transducer and the second pressure transducer is one of selected from the group comprising an absolute pressure transducer and another differential pressure transducer;

Clause 4, the apparatus of clause 1, wherein the flow through path is between the first reservoir and the second reservoir;

Clause 5, the apparatus of clause 1, wherein the flow through path fluidly couples an end of the first reservoir with another end of the second reservoir;

Clause 6, the apparatus of clause 1, wherein a volume of the first reservoir is determined based on a bleed down time, the bleed down time determined by dividing the volume in the respective reservoir by the full scale flow rate of the MFC;

Clause 7, the apparatus of clause 1, wherein a volume of the second reservoir is determined based on a bleed down time, the bleed down time determined by dividing the volume in the respective reservoir by the full scale flow rate of the MFC;

Clause 8, a system for removing dead volume in a sensor assembly of a mass flow controller, the system comprising: a valve assembly in fluid communication with fluid in a primary flow path; a pressure sensor assembly in fluid communication with fluid in the primary flow path, the pressure sensor assembly comprising: a first reservoir coupled to a first pressure transducer and having a port in fluid communication at a location in a sampled flow path; a second reservoir coupled to a second pressure transducer, fluidly coupled to the first reservoir through a flow through path, and having another port in fluid communication at another location of another sampled flow path; wherein the first pressure transducer and the second pressure transducer are communicable coupled with the valve assembly;

Clause 9, the system of clause 8, wherein the first pressure transducer is an absolute pressure transducer and the second pressure transducer is one of selected from the group comprising another absolute pressure transducer and a differential pressure transducer;

Clause 10, the system of clause 8, wherein the second pressure transducer is a differential pressure transducer and the second pressure transducer is one of selected from the group comprising an absolute pressure transducer and another differential pressure transducer;

Clause 11, the system of clause 8, wherein the flow through path is between the first reservoir and the second reservoir;

Clause 12, the system of clause 11, wherein the flow through path fluidly couples an end of the first reservoir with another end of the second reservoir;

Clause 13, the system of clause 8, wherein a volume of the first reservoir is determined based on a bleed down time, the bleed down time determined by dividing the volume in the respective reservoir by the full scale flow rate of the MFC;

Clause 14, the system of clause 13, wherein a volume of the second reservoir is determined based on a bleed down time, the bleed down time determined by dividing the volume in the respective reservoir by the full scale flow rate of the MFC;

Clause 15, a method for removing dead volume in a sensor assembly of a mass flow controller, the method comprising: pumping fluid from a primary flow path through a port into a first reservoir coupled to a first pressure transducer; and pumping fluid from the first reservoir into a second reservoir coupled to a second pressure transducer through a flow through path and through another port;

Clause 16, the method of clause 15, wherein the first pressure transducer is an absolute pressure transducer and the second pressure transducer is one of selected from the group comprising another absolute pressure transducer and a differential pressure transducer;

Clause 17, the method of clause 15, wherein the second pressure transducer is a differential pressure transducer and one and the second pressure transducer is one of selected from the group comprising an absolute pressure transducer and another differential pressure transducer;

Clause 18, the method of clause 15, further comprising pumping fluid from the first reservoir through the flow through path, wherein the flow through path is between the first reservoir and the second reservoir;

Clause 19, the method of clause 18, further comprising pumping fluid from the first reservoir through the flow through path, wherein the flow through path fluidly couples an end of the first reservoir with another end of the second reservoir; and Clause 20, the method of clause 15, wherein a volume of the first reservoir is determined based on a bleed down time, the bleed down time determined by dividing the volume in the respective reservoir by the full scale flow rate of the MFC.

What is claimed is:

1. An apparatus for removing dead volume in a sensor assembly, the apparatus comprising:
a first reservoir located in a bypass to a primary flow path;
a first pressure transducer coupled to the first reservoir having a first side with a first pressure sensing face disposed on the first side;
a second reservoir located in the bypass to the primary flow path wherein the first reservoir and the second reservoir are fluidly coupled via a fluid coupling;
a second pressure transducer coupled to the second reservoir having a second side with a second pressure sensing face disposed on the second side, the first side and the first pressure sensing face facing the second side and the second pressure sensing face;
a restrictor disposed in the fluid coupling between the first and second reservoir, the restrictor located between the first side with the first pressure sensing face and the second side with the second pressure sensing face such that the first side and the second side face the restrictor;
an inlet from the primary flow path to the first reservoir located between the first side with the first pressure sensing face and the restrictor; and
an outlet from the second reservoir to the primary flow path located between the second side with the second pressure sensing face and the restrictor, wherein the apparatus is configured to remove dead volume by providing a flow through fluid path across the first and second sensing faces.

2. The apparatus of claim 1, wherein the first pressure transducer is an absolute pressure transducer and the second pressure transducer is one of selected from the group comprising another absolute pressure transducer and a differential pressure transducer.

3. The apparatus of claim 1, wherein the first pressure transducer is a differential pressure transducer and the second pressure transducer is one of selected from the group comprising an absolute pressure transducer and another differential pressure transducer.

4. The apparatus of claim 1, wherein the fluid coupling is an opening between the first reservoir and the second reservoir.

5. The apparatus of claim 1, wherein an end of the first reservoir is fluidly coupled with another end of the second reservoir via the fluid coupling.

6. The apparatus of claim 1, wherein a defined volume of the first reservoir is determined based on a designed bleed down time.

7. The apparatus of claim 1, wherein a defined volume of the second reservoir is determined based on a designed bleed down time.

8. A system for removing dead volume in a sensor assembly of a mass flow controller, the system comprising:
a valve assembly in fluid communication with fluid in a primary flow path;
a pressure sensor assembly in fluid communication with fluid in the primary flow path, the pressure sensor assembly located in a bypass of a primary flow path, the pressure sensor assembly comprising:
a first reservoir coupled to a first pressure transducer having a first side with a first pressure sensing face disposed on the first side;
and having a port in fluid communication at a location in a sampled flow path;
a second reservoir that is coupled to a second pressure transducer having a second side with a second pressure sensing face disposed on the second side, the first side of the first pressure sensing face facing the second side and the second pressure sensing face, the second reservoir fluidly coupled to the first reservoir through a flow through path, wherein a restrictor is disposed between the first reservoir and the second reservoir, the restrictor located between the first side with the first pressure sensing face and the second side with the second pressure sensing face such that the first side and the second side face the restrictor;
an inlet from the primary flow path to the first reservoir located between the first side with the first pressure sensing face and the restrictor;
an outlet to the primary flow path from the second reservoir located between the second side of the second pressure sensing face and the restrictor; and
wherein the first pressure transducer and the second pressure transducer are communicatively coupled with the valve assembly and configured to remove dead volume by providing a flow through path across the first and second sensing faces.

9. The system of claim 8, wherein the first pressure transducer is an absolute pressure transducer and the second pressure transducer is one of selected from the group comprising another absolute pressure transducer and a differential pressure transducer.

10. The system of claim 8, wherein the first pressure transducer is a differential pressure transducer and the second pressure transducer is one of selected from the group comprising an absolute pressure transducer and another differential pressure transducer.

11. The system of claim 8, wherein the flow through path is between the first reservoir and the second reservoir.

12. The system of claim 8, wherein the flow through path fluidly couples an end of the first reservoir with another end of the second reservoir.

13. The system of claim 8, wherein a defined volume of the first reservoir is determined based on a designed bleed down time.

14. The system of claim 8, wherein a defined volume of the second reservoir is determined based on a designed bleed down time.

15. A method for operating a mass flow controller with a reduced dead volume in a sensor assembly of the mass flow controller, the method comprising:
routing fluid from a primary flow path to a bypass through a port into a first reservoir coupled to a first pressure transducer having a first side with a first pressure sensing face disposed on the first side;
routing fluid from the first reservoir into a second reservoir that is coupled to a second pressure transducer through a flow through path configured to remove dead volume, the second pressure transducer having a second side with a second pressure sensing face disposed on the second side, the first side with the first pressure sensing face facing the second side with the second pressure sensing face, and then routed back to the primary flow path, the fluid having flowed across the first and second sensing faces, wherein a restrictor is disposed between the first reservoir and the second reservoir, the restrictor located between the first side with the first pressure sensing face and the second side of the second pressure sensing face,
an inlet to the first reservoir located between the first side of the first pressure sensing face and the restrictor; and
an outlet to the second reservoir located between the second side of the second pressure sensing face and the restrictor.

16. The method of claim 15, wherein the first pressure transducer is an absolute pressure transducer and the second pressure transducer is one of selected from the group comprising another absolute pressure transducer and a differential pressure transducer.

17. The method of claim 15, wherein the first pressure transducer is a differential pressure transducer and the second pressure transducer is one of selected from the group comprising an absolute pressure transducer and another differential pressure transducer.

18. The method of claim 15, further comprising pumping fluid from the first reservoir through the flow through path, wherein the flow through path is between the first reservoir and the second reservoir.

19. The method of claim 15, further comprising pumping fluid from the first reservoir through the flow through path, wherein the flow through path fluidly couples an end of the first reservoir with another end of the second reservoir.

20. The method of claim 15, wherein a defined volume of the first reservoir is determined based on a designed bleed down time.

* * * * *